(12) United States Patent
Henderson et al.

(10) Patent No.: US 6,324,652 B1
(45) Date of Patent: Nov. 27, 2001

(54) ASYNCHRONOUS SWITCHING CIRCUIT FOR MULTIPLE INDETERMINATE BURSTING CLOCKS

(75) Inventors: Nathaniel Henderson; David Brown; Lai-Chin Lo; Ngo Ho, all of San Jose, CA (US)

(73) Assignee: 3COM Corporation, Santa Clara, CA (US)

( * ) Notice: Subject to any disclaimer, the term of this patent is extended or adjusted under 35 U.S.C. 154(b) by 0 days.

(21) Appl. No.: 09/232,862

(22) Filed: Jan. 15, 1999

(51) Int. Cl.[7] ........................................... G06F 1/04
(52) U.S. Cl. ............................... 713/500; 713/501
(58) Field of Search ............................. 713/400, 500, 713/501, 601

(56) References Cited

U.S. PATENT DOCUMENTS

| | | | |
|---|---|---|---|
| 5,481,697 | * | 1/1996 | Mathews et al. ............... 713/501 |
| 5,564,042 | * | 10/1996 | Ventrone et al. ............... 713/501 |
| 5,758,132 | * | 5/1998 | Strahlin ........................ 713/501 |
| 5,790,609 | * | 8/1998 | Swoboda ...................... 375/357 |
| 5,911,064 | * | 6/1999 | Samsom et al. ............... 713/501 |

OTHER PUBLICATIONS

IBM Technical Disclosure, Method To Select One Of Two Clocks While Avoiding Narrow Pulses, vol. 32 No. 9B, Feb. 1990, pp. 82–84.*

* cited by examiner

*Primary Examiner*—Dennis M. Butler
(74) *Attorney, Agent, or Firm*—Wagner, Murabito & Hao LLP

(57) ABSTRACT

An asynchronous switching circuit for multiple indeterminate bursting clocks. In one embodiment, the present invention recites a clock-switching circuit that provides a single unclipped and glitch-free clock signal at its output from among multiple clock inputs. The clock-switching circuit is comprised of a plurality of asynchronously-enabled clock circuits, a plurality of blocking circuits, a synchronizing clock, and a logic gate. Each of the plurality of blocking circuits has an input lead respectively coupled to one of the plurality of asynchronously-enabled clock circuits, each of the plurality of blocking circuits also has an output coupled to all of the plurality of asynchronously-enabled clock circuits except the one to which its input is coupled. The synchronizing clock is coupled to each of the plurality of blocking circuits while the logic gate is coupled to each of the plurality of asynchronously-enabled clock circuits.

12 Claims, 11 Drawing Sheets

ASYNCHRONOUS SWITCHING CIRCUIT FOR MULTIPLE INDETERMINATE BURSTING CLOCKS

TECHNICAL FIELD

The present claimed invention relates to the field of semiconductor devices. Specifically, the present claimed invention relates to an apparatus and a method for switching between multiple clocks in an electrical circuit to provide a single clock output.

BACKGROUND ART

Often, a client computer uses a network interface card (NIC) to communicate on a network with a host computer or with other client computers. The NIC typically implements the hardware and software necessary to prepare outgoing data and interpret incoming data in a format protocol and speed appropriate for the network. Data may be transmitted at a variety of speeds. However, only two standard data transmission speeds, 10 megabits per second (Mbps) and 100 Mbps, will be referred to herein. The NIC uses a clock signal to enable logic devices therein to transmit and accept data and to perform other functions. Proper implementation of one or more clock signals into the NIC is critical to provide error-free data transmission. A clock-enable circuit is a method whereby a clock signal is introduced into a NIC.

Referring to Prior Art FIG. 1A, a time trace 100 of multiple logic signals of a clock-enable circuit is presented. Clock signal 102 is input to the clock-enable circuit at a specific frequency and a specific pulse width 104. Enable signal 106 is also input into the clock-enable circuit to tell the clock-enable circuit when to provide the input clock signal 102 as an output signal 108.

Enable signal 106 is referred to as asynchronous because it can be switched on or off at any time, not just at the positive or negative edge of a pulse. Hence, if enable signal 106 goes to a high logic level 110 part-way through a high logic level 112 of clock signal 102, then output signal 108 has a high logic level 114 with a pulse width 116 that is shorter than the actual pulse width 104 of clock signal 102. This phenomenon is referred to as a glitch. It produces a clipped clock signal because the pulse width 116 of the output signal 108 is shorter than the pulse width 104 of the input clock signal 102.

The glitch in output signal 108 may cause downstream logic devices to malfunction. Logic devices timed to output signal 108 require specific pulse-widths for set-up and hold times, for changing states, propagating signals and, in general, becoming stable. More specifically, a glitch in the clock signal would most likely cause the Media Access Control (MAC) logic to go into an unknown state, thereby locking up the NIC or the host computer. A software reset may be insufficient to recover the transmitted data or to correct the locked-up computer. In such a case, a hard restart would be required to reset the hardware. Hence, a need exists for an asynchronously enabled clock circuit to provide a glitch-free and unclipped output signal with pulse widths identical to the input clock signal.

In the prior art, a block of logic called the auto-negotiation block, external from the Ethernet controller, provides a glitch-free output clock signal and allows switching between multiple clock input signals. The output clock signal from the auto-negotiation block is communicated to the Ethernet controller, the brains of the network interface card, and to the MAC portion of the logic. Because the external auto-negotiation block in the prior art always provides a glitch-free output clock signal, software can be used to manage switching from one input clock signal to a second input clock signal. This switching is called auto negotiation switching (ANS). ANS is a method of negotiating the speed of data transmission when the network adapter of an NIC is plugged into any hub (switch), e.g. 100 Mbps full-duplex or 10 Mbps half-duplex.

For example, the managing software can simply tell the external auto-negotiation block to switch clocks at any time without concern about a clock glitch because the external auto-negotiation block already guaranteed a glitch-free clock signal. The Ethernet-software driver polls the auto-negotiation status registers at a regular interval, and if the auto-negotiation status changes, the driver takes the appropriate action, such as resetting the MAC. However, as mentioned, the auto-negotiation block is an external component that consumes space and requires interconnections. Furthermore, the software implementation of switching consumes more time than would a hardware implementation. Thus, a need arises to reduce the size and the quantity of external components, and to reduce software delays occurring in an external auto-negotiation block.

One method of satisfying this need is to internalize the auto-negotiation block onto the Ethernet controller circuit as an application specific integrated circuit (ASIC). Unfortunately, the software used to control the external auto-negotiation block cannot be used to control an internal (ASIC) auto-negotiation block. The initial clock switching during the computer startup would most likely create an unknown condition in the MAC logic or the internal auto-negotiation circuit before any software code could be implemented. For example, when the network interface is first powered up, the client negotiates through the physical layer with host to determine the appropriate transmission protocol. The physical layer automatically communicates at a default 10 Mbps speed. If the NIC is plugged into a 100 Mbps hub, then the auto-negotiation logic will automatically switch (e.g. asynchronously) from 10 Mbps to 100 Mbps (i.e. from 10 MHz to 25 MHz). Because this switching operation is asynchronous a glitch is highly likely. Consequently, a system failure would most likely follow.

Besides the initial clock instability, switching between multiple clock signals requires all input clock signals to be glitch-free. If switching was performed synchronously with the clock signal, a glitch would not be a concern. However, because the user has the capability of physically disconnecting and reconnecting to the network connection at any time, the process of switching becomes asynchronous. By eliminating the external auto-negotiation logic block, its characteristic of providing glitch-free clock signals despite the asynchronous switching is no longer available. Hence, software cannot reliably be used for switching between clock signals with potential glitches. If a glitch occurs during the switching of a clock and a data packet was actively being transmitted at the same time, then the data would probably be lost. Additionally, the glitch would most likely cause the client computer to freeze-up, thereby requiring a hard restart. Consequently, a need arises for an internal auto-negotiation clock-switching circuit that provides glitch-free clock signals for start-up and for switching.

Referring now to Prior Art FIG. 1B, a time trace 150 of multiple glitch-free enabled clock signals of a clock-switching circuit is presented. In this scenario, a first output signal 152 currently being output from a auto-negotiation block will be changed to a second output signal 154 having a frequency the same as, or different from, that of the first. The switching will occur as a result of changes in asynchronous enabling signals 156 and 170. While first output signal 152 and second output signal 154 might both have glitch-free, or unclipped, wave forms, the timing of disabling first output signal 152 and of enabling second output signal 154 could create a glitch in the final output 162 of the auto-negotiation logic block. For example, if first output signal 152 is disabled at a low logic period 158, and if second output signal 154 is enabled at a high logic period 160 without sufficient wait time, then the composite final output 162 will appear as having a glitch 164. Hence, a need arises for a clock-switching circuit that can guarantee asynchronous switching between unclipped clock signals without creating a glitch from the switching process.

As previously mentioned, the NIC operates at multiple data rates that are regulated by their respective clock rates. The multiple data rates exist both for a transmitted signal as well as a received signal. Hence, the transmitted signal uses multiple clock frequencies and the received signal uses multiple clock frequencies. However, the method by which a clock frequency is established for a transmitted signal is different from that for a received signal. A transmission signal operating at 100 Mbps uses an ASIC oscillator clock located on the NIC that operates at 25 MHz. Likewise, a transmission signal operating at 10 Mbps uses an ASIC clock located on the NIC that operates at 10 MHz.

In contrast, the received signal always operates from a recovered clock generated by a phase lock loop (PLL) circuit. The PLL locks onto the frequency and phase of the data stream that is received at the NIC from the switch (hub). If the signal received at the NIC was sent by the hub at 10 Mbps, then the recovered clock establishes a 10 MHz clock. Likewise, if the signal received at the NIC was sent by the hub at 100 Mbps, then the recovered clock establishes a 25 MHz clock. Unfortunately, only the 100 Mbps hub sends a signal to the PLL at the client computer regardless of whether data is being sent or not. The 10 Mbps hub only sends a signal when it is actually transmitting data to the client. Hence, the 10 Mbps based recovered clock has many instances when a recovered clock cannot be established.

The conventional logic arrangement, e.g. external auto-negotiation block and undivided physical layer, requires a 25 MHz clock signal input as the first clock. Additionally, conventional designs always keep one clock running. If at least one clock is not running, the circuit logic will not reset properly and thereby prevent switching. Conventionally, if a clock is not recovered, circuit logic will multiplex (MUX) in another clock to keep the recovery logic running. A MUX clock is created by dividing down an existing clock such as the 25 MHz clock or by creating a new clock based on its own crystal. Hence, a conventional NIC may need two crystals, one at 10 MHz and a second at 25 MHz. In this manner, if a clock cannot be recovered due to the absence of a data stream, the NIC could switch over to another (MUX) clock from an external source (via asynchronous switching). Unfortunately, an additional clock increases cost, quantity of components, and circuit complexity. Subsequently a need arises for a clock switching circuit that can function with or without a recovered clock signal.

In summary, a need exists for an asynchronously enabled clock circuit to provide an output clock signal with unclipped pulse widths approximately identical to the input clock signal. Furthermore, a need exists to reduce the size, external components, and software delays occurring in a clock-switching circuit. At the same time, a need exists for the clock-switching circuit to provide an unclipped clock output signal at start-up and during switching. Besides the aforementioned needs, a further need exists for the clock-switching circuit that can guarantee asynchronous switching between unclipped clock signals without creating a glitch in the output from the switching process. Finally, a need exists for a clock-switching circuit that can exist with or without a recovered clock signal.

DISCLOSURE OF THE INVENTION

The present invention provides an asynchronously-enabled clock circuit that provides an output clock signal with unclipped pulse widths approximately identical to the input clock signal. Furthermore, the present invention provides a clock-switching circuit with reduced size, with internal components, and without traditional software delays. At the same time, the present invention provides a clock-switching circuit with unclipped output clock signals for start-up and for switching. Additionally, the present invention provides a clock-switching circuit that guarantees asynchronous switching between unclipped clock signals without creating a glitch in the switching process. Finally, the present invention provides a clock-switching circuit that can exist with or without a recovered clock signal.

Specifically, in one embodiment, the present invention recites an asynchronously-enabled clock circuit that provides an unclipped clock signal at its output. The asynchronously-enabled clock circuit is comprised of a clock input lead, an enable lead, a negatively-enabled logic block, a synchronizer, and an output logic gate. The negatively-enabled logic block is coupled to the clock input lead and to the enable lead while the output logic gate is coupled to the negatively-enabled logic block and to the clock input lead. The clock input lead provides a clock signal to the asynchronously-enabled clock circuit. The enable lead is provided to receive a signal that determines when the asynchronously-enabled clock circuit will provide the clock signal as its output.

In another embodiment, the present invention recites a clock-switching circuit that provides a single unclipped and glitch-free clock signal as its output from among multiple clock inputs. The clock-switching circuit is comprised of a plurality of asynchronously-enabled clock circuits, a plurality of blocking circuits, a synchronizing clock, and a logic gate. Each of the plurality of blocking circuits has an input lead respectively coupled to one of the plurality of asynchronously-enabled clock circuits. Each of the plurality of blocking circuits also has an output coupled to all of the plurality of asynchronously-enabled clock circuits except the one to which its input is coupled. The output of each of the plurality of blocking circuits disables all of the plurality of asynchronously-enabled clock circuits except the one to which its input is coupled. The synchronizing clock is coupled to each of the plurality of blocking circuits while the logic gate is coupled to each of the plurality of asynchronously-enabled clock circuits. The logic gate provides the unclipped and glitch-free output signal from the clock-switching circuit.

These and other objects and advantages of the present invention will no doubt become obvious to those of ordinary skill in the art after having read the following detailed description of the preferred embodiments illustrated in the various drawing figures.

BRIEF DESCRIPTION OF THE DRAWINGS

The accompanying drawings, which are incorporated in and form part of this specification, illustrate embodiments of the invention and, together with the description, serve to explain the principles of the invention.

PRIOR ART

PRIOR ART

The drawings referred to in this description should be understood as not being drawn to scale except as specifically noted.

BEST MODE FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail as not to unnecessarily obscure aspects of the present invention.

CIRCUIT DESCRIPTIONS

Figure 1A:
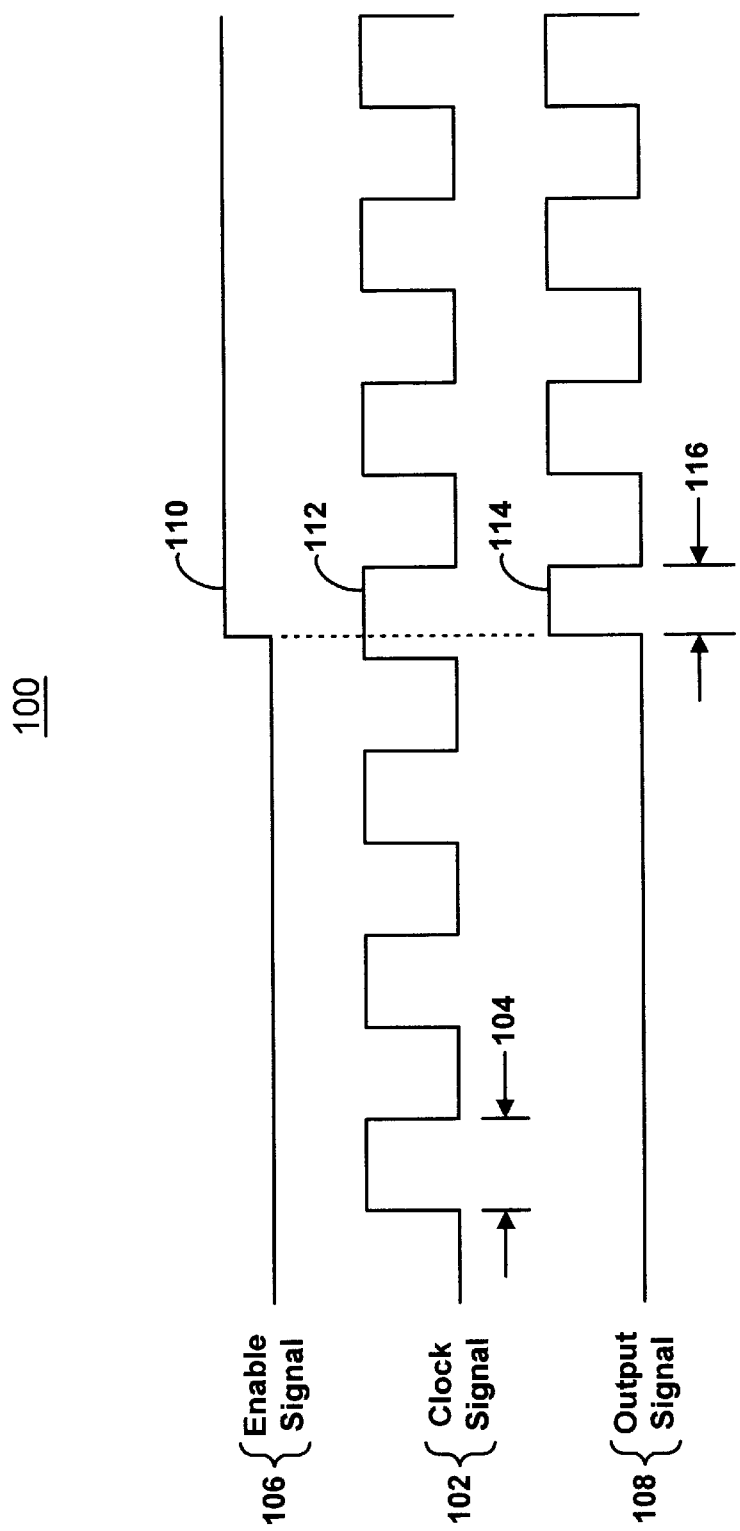
FIG. 1A is a time-trace of multiple logic signals for a conventional clock-enable circuit.
Figure 1B:
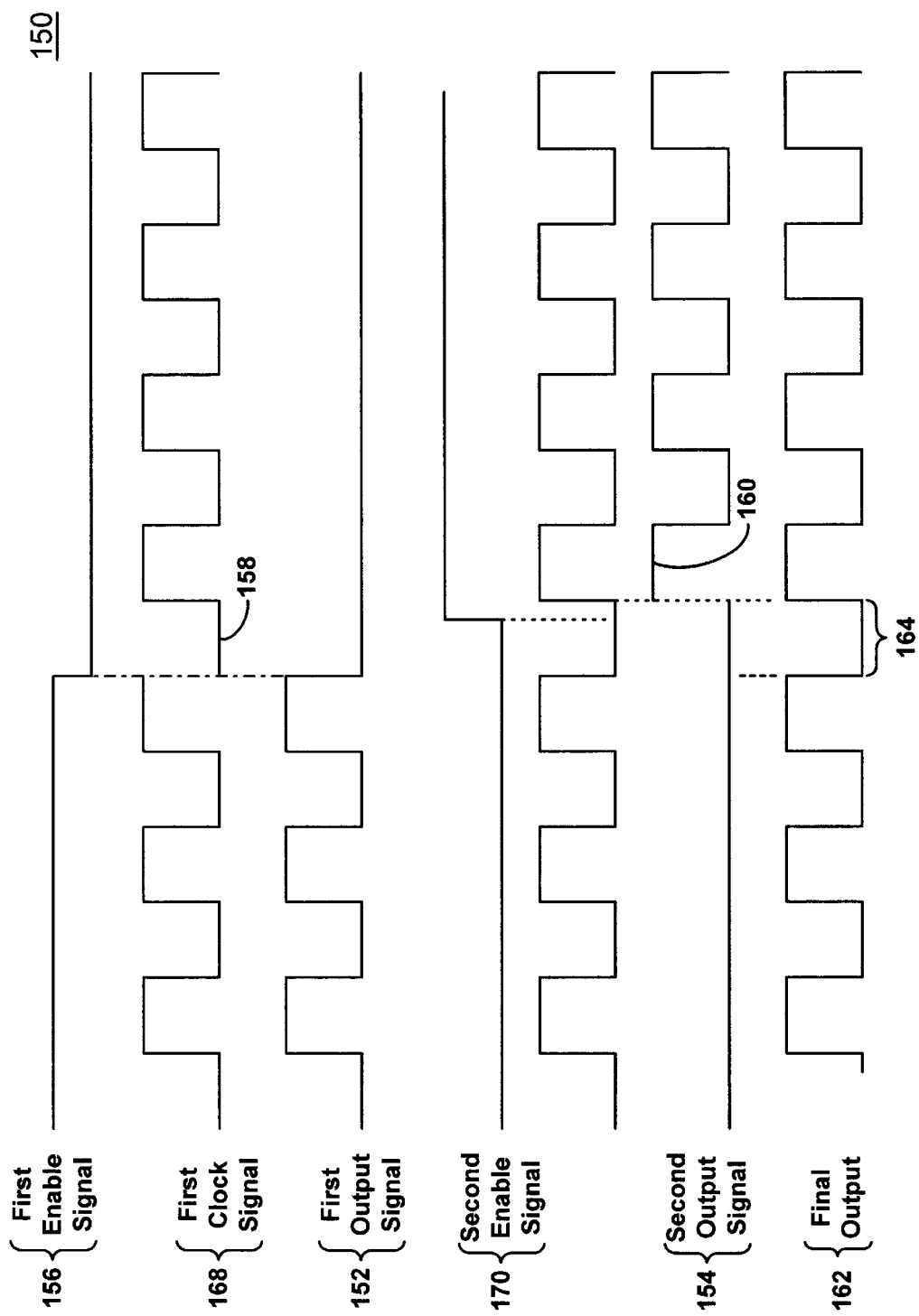
FIG. 1B is a time trace of multiple unclipped enabled clock signals for a convention, clock-switching circuit.
Figure 2A:
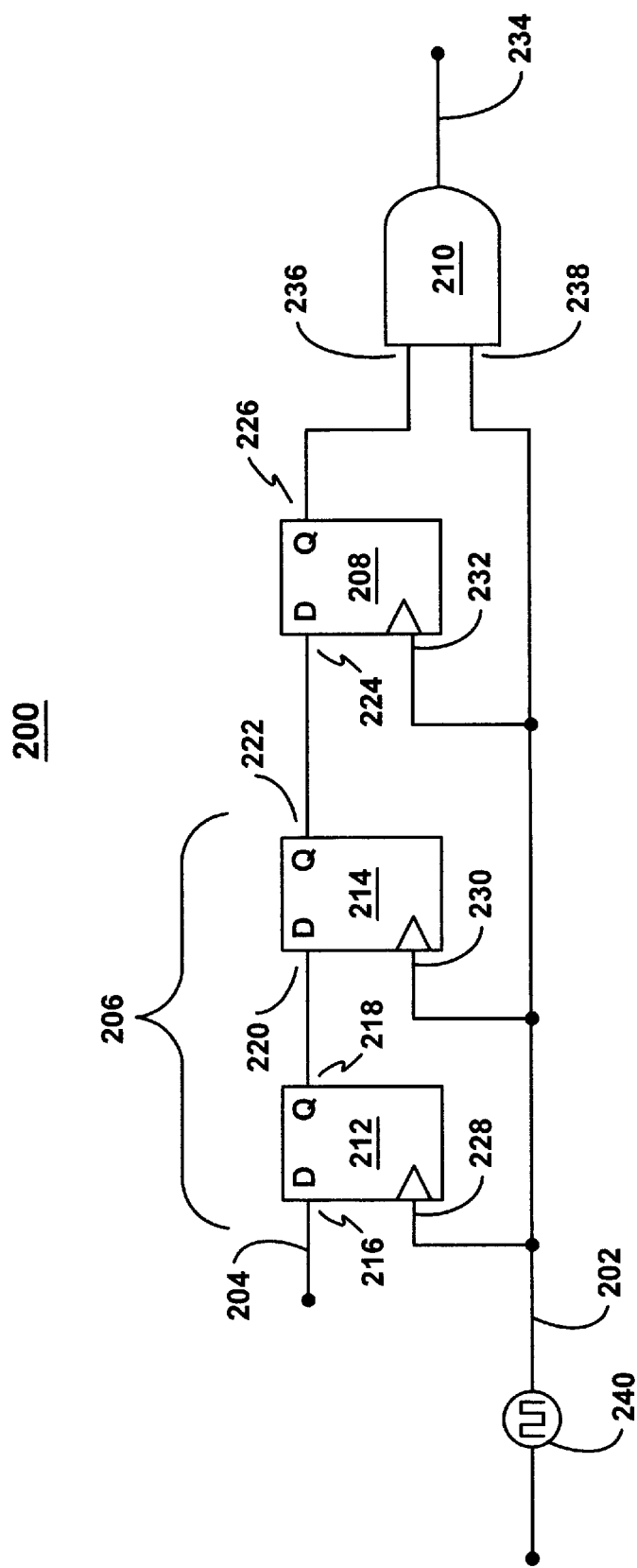
FIG. 2A is an electrical schematic of an asynchronously-enabled clock circuit in accordance with one embodiment of the present invention.

With reference now to FIG. 2A, an asynchronously-enabled clock circuit 200 is presented. Embodiments of the electrical apparatus for the present invention will be described in detail below. In a subsequent and separately labeled section, embodiments of the methods and steps used in the present invention will be described in detail. The asynchronously-enabled clock circuit 200 presented in FIG. 2A is comprised of a clock input lead 202, an enable lead 204, a synchronizer 206, a negatively-enabled logic block 208, and a logic gate 210. Synchronizer 206, in turn is comprised of a first positively-enabled data flip-flop 212 and a second positively-enabled data flip-flop 214. While the present embodiment illustrates synchronizer 206 as comprised of two data flip-flops, the present invention is equally well suited to alternative synchronizer components and construction. Additionally, the present embodiment illustrates negatively-enabled logic block 208 as a data flip-flop, the present invention is equally well suited to alternative negative enabling logic. Finally, while the present embodiment illustrates logic gate 210 as a two input "AND" gate, the present invention is equally applicable to alternative logic hardware that would provide a similar output from a similar input. The present embodiment is well-suited to including additional elements in the circuit, other than those illustrated, that may enhance its performance.

Components of the present embodiment of an asynchronously-enabled clock circuit 200 are coupled as follows. Enable lead 204 is coupled to data input 216 of first positively-enabled data flip-flop 212, whose normal output 218 is coupled to data input 220 of second positively-enabled data flip flop 214. In turn, normal output 222 of second positively-enabled data flip-flop 214 is coupled to data input 224 of negatively-enabled logic block 208, whose normal output 226 is coupled to the first input 236 of logic gate 210. On the bottom of asynchronously-enabled clock circuit 200 is a clock input lead 202 coupled to a clock device 240 and coupled to a positively-enabled (positive-going transistor, PGT) clock input 228 and 230 of first and second positively-enabled data flip-flop 212 and 214 respectively, to a negatively-enabled (negative-going transition, NGT) clock input 232 of negatively-enabled logic block 208, and to second input 238 of logic gate 210. Note that FIG. 2B will be described in the method section hereinafter where it will be interpreted with respect to FIG. 2A.

Figure 3A:
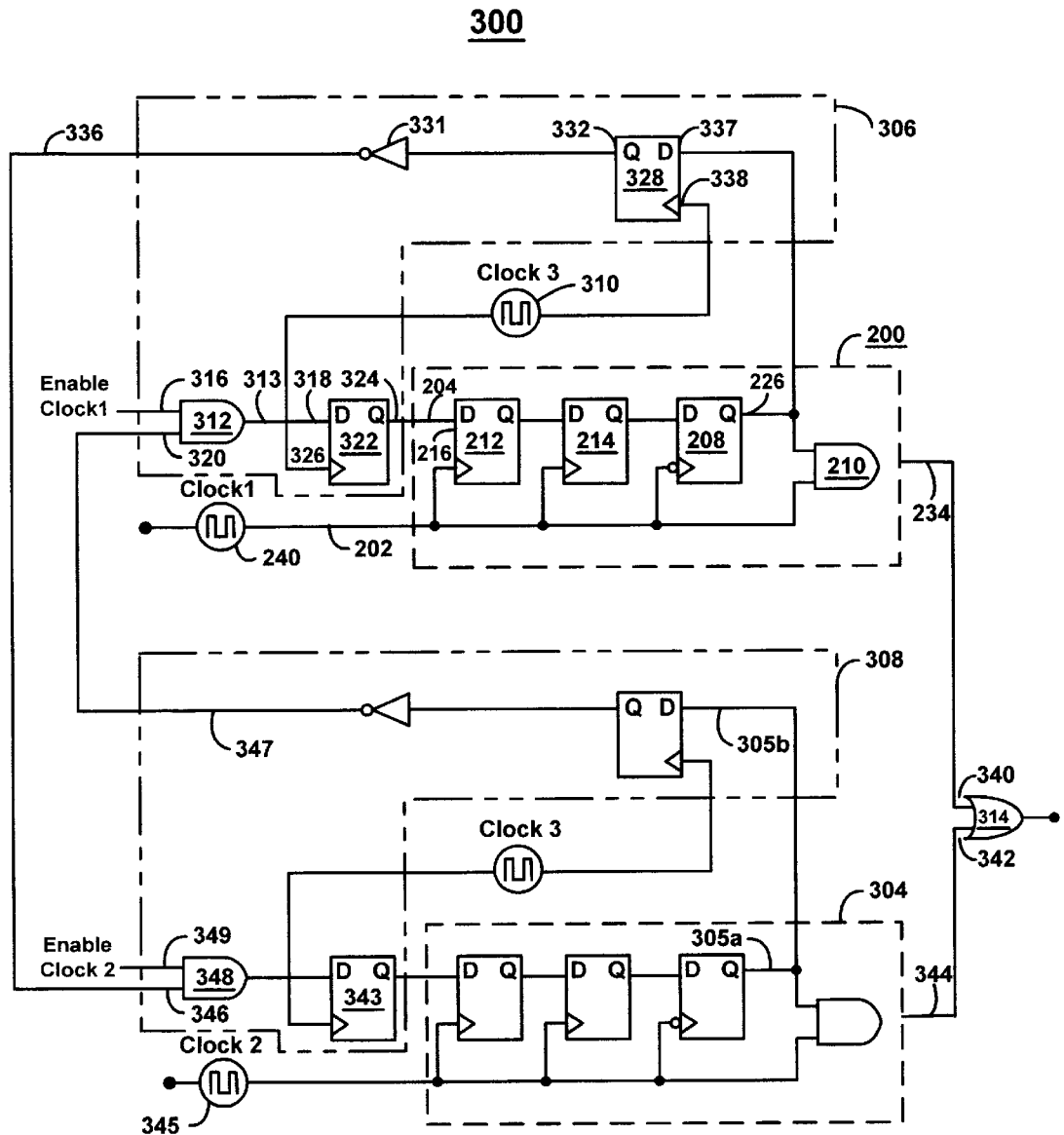
FIG. 3A is an electrical schematic of a clock-switching circuit in accordance with one embodiment of the present invention.

Referring now to FIG. 3A, a clock-switching circuit that provides a single unclipped and glitch-free clock signal at its output from among multiple clock inputs is presented. The clock-switching circuit is comprised of a first and a second asynchronously-enabled clock circuit 200 and 304 respectively, a plurality of blocking circuits 306 and 308 respectively, a synchronizing clock 310, and a logic gate 314. In the present embodiment, the plurality is a quantity of two in order to clarify the illustration. However, the present invention is well-suited to any plurality of components and/or asynchronously-enabled clock circuits Each of the two asynchronously-enabled clock circuits 200 and 304 are comprised of the same components, as described in FIG. 2A. Likewise, each blocking circuit 306 and 308 is comprised of the same components in the same coupling arrangement. Therefore, for purposes of clarity, only one combination of asynchronously-enabled clock circuit 200 and blocking circuit 306 will be described herein. In another embodiment of the present invention, the clock switching-circuit is comprised of more than two of these combinations and is a repetition of the components and coupling presented herein.

Still referring to FIG. 3A, blocking circuit 306 is comprised of logic gate 312, first data flip-flop 322, and second data flip-flop 328. Clock enable lead 316 and blocking-input lead 320 are coupled to the input of logic gate 312 while the output of logic gate 312 is coupled to data input 318 of first data flip-flop 322. Blocking-input lead 320 is coupled to the output, e.g. output lead 347, of each of the remaining plurality of blocking circuits, e.g. blocking circuit 308. In the present embodiment, there is only one remaining blocking circuit 308. However, if more blocking circuits were added, blocking-input lead 320 would be coupled to them as well. Normal output 324 of first data flip-flop 322 is coupled to data input 216 of asynchronously-enabled clock circuit 200.

Synchronizing clock 310 is coupled to clock input 326 of first data flip-flop 322 and to clock input 338 of second data flip-flop 328. In the present embodiment, synchronizing clock 310 supplies a clock signal to all of the plurality of blocking circuits. Second data flip-flop 328 has a data input 330 coupled to normal output 226 of negatively-enabled flip-flop 208 in asynchronously-enabled clock circuit 200. Similarly, second data flip-flop 328 has a normal output 332 coupled to an inverter 334 that is subsequently coupled to an output lead 336.

While the present embodiment utilizes an inverter 334, the present invention is equally well suited to using an inverted output from data flip-flop 328 in place of a discrete inverter component 334. To complete the circuit, output lead 336 is coupled to all other blocking circuits. In the present embodiment, because there is only one other blocking circuit 308, output lead is only coupled to single input lead 346. However, if a greater plurality of circuits were utilized, blocking lead output would be coupled to the other blocking circuits as well. Additionally, while the present embodiment utilizes logic gates such as 312 to check for a blocking signal from other blocking circuits, e.g. 308, the present invention is equally well suited to using alternative circuitry. For example, a transistor deactivated by a blocking signal could couple enable clock signal to reach data input 318 of first data flip-flop 322.

Output logic gate 314 for clock-switching circuit 300 has inputs coupled to each of the plurality of asynchronously-enabled clock circuits 200 and 304. In the present embodiment the plurality is equivalent to two. Hence, output gate logic has inputs 340 and 342 coupled to output lead 234 and 344 of asynchronously-enabled clock circuits 200 and 304 respectively. Output logic gate 314 provides a single unclipped and glitch-free output signal from clock-switching circuit 300. In one embodiment, clocks 240 and 345 are independent clock sources. In an alternative embodiment, one of clocks 240 and 345 can be a recovered clock signal.

Figure 4:
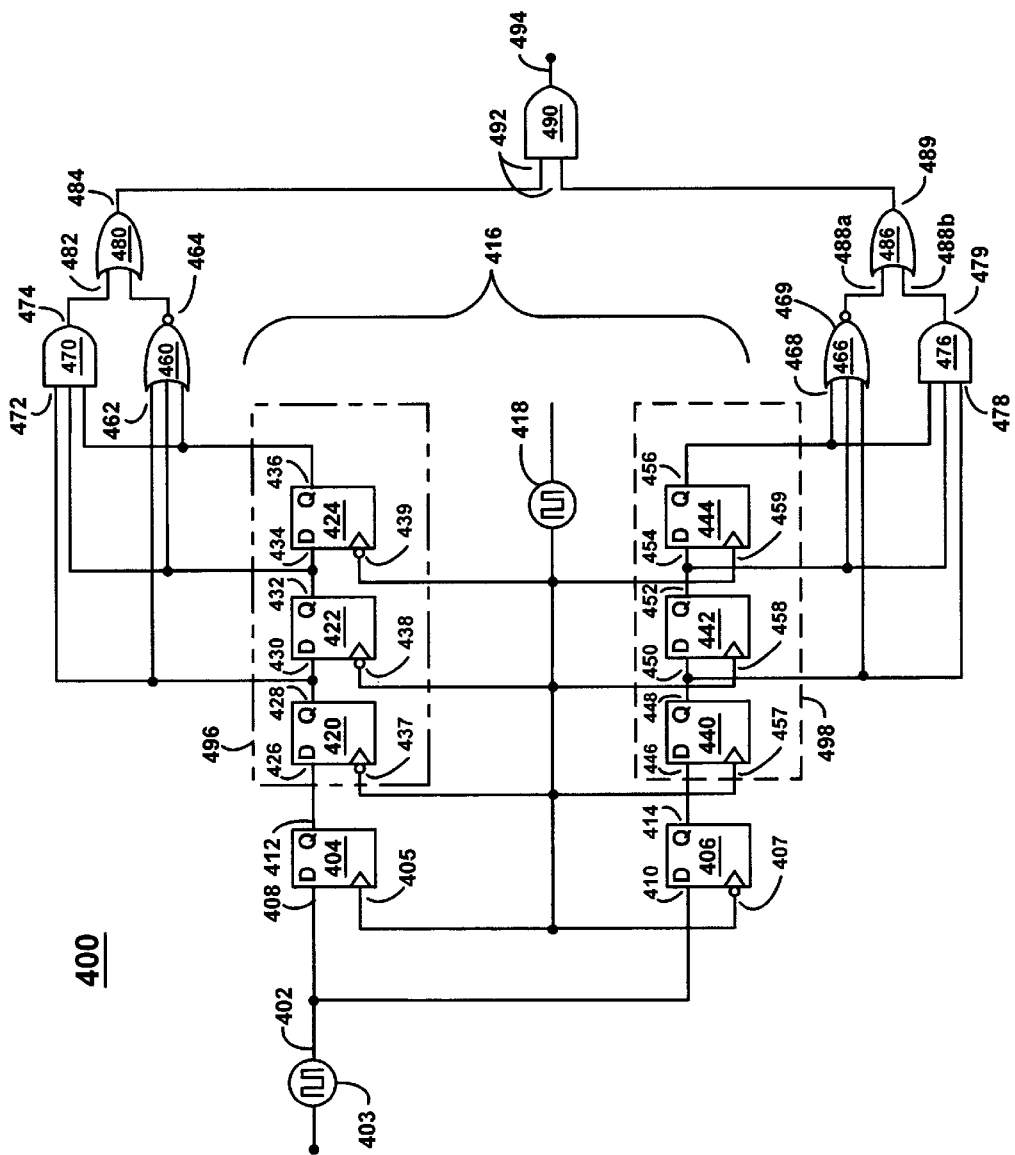
FIG. 4 is an electrical schematic of a clock monitoring circuit in accordance with one embodiment of the present invention.

Referring now to FIG. 4, a clock-monitoring circuit 400 is presented. Clock-monitoring circuit 400 indicates whether an input clock 403 is operating correctly at a frequency ranging from five times less to two and one-half times less than a monitoring clock 418. If the frequency of input clock 403 falls below the range specified, then clock-monitoring circuit 400 indicates the malfunction of clock 403 to the clock-switching circuit 300.

The clock monitoring circuit 400 is comprised of an input lead 402 coupled to a clock source 403, to a data input 408 of a positively-enabled sensing circuit 404 and to a data input 410 of negatively-enabled sensing circuit 406. While the sensing circuit 404 and 406 are comprised of positively-enabled and negatively-enabled data flip-flops in the present embodiment, the present invention is well-suited to alternative circuits and logic for sensing the clock source 403. Furthermore, while the present embodiment senses clock source 403 twice for every cycle of a monitoring clock 418 at frequency 'x', and thereby requiring a positively and negatively enabled sensing circuits 404 and 406, the present invention is equally well-suited to sensing clock source 403 once for every cycle of monitoring clock 418 operating at greater than twice frequency 'x', thereby satisfying the Nyquist rate.

Still referring to FIG. 4, positively-enabled sensing circuit 404 has a normal output 412 coupled to an indexing circuit 496, and negatively-enabled sensing circuit 406 has a normal output 414 coupled to an indexing circuit 498.

In the present embodiment, indexing circuits 496 and 498 are enabled at a logic level opposite that of their respective sensing circuit 404 and 406. However, the present invention is equally-well suited to using alternative circuitry and apparatus for indexing a signal provided by a sensing circuit. In the indexing circuit 496, data input 426 of data flip-flop 420 is coupled to normal output 412 of sensing circuit 404, normal output 428 of data flip-flop 420 is coupled to data input 430 of data flip-flop 422, normal output 432 of data flip-flop 422 is coupled to data input 434 of data flip-flop 424.

Similarly, in the indexing circuit 498, data input 446 of data flip-flop 440 is coupled to normal output 414 of sensing circuit 406, normal output 448 of data flip-flop 440 is coupled to data input 450 of data flip-flop 442, normal output 452 of data flip-flop 442 is coupled to data input 454 of data flip-flop 444. While the present embodiment utilizes a total of six data flip flops 420, 422, 424, 440, 442, and 444 in indexing circuits 496 and 498, the present invention is well-suited to using any quantity of data flip-flops as would be appropriate for the frequency signals involved. This consideration will be discussed in the method section hereinafter.

Monitoring clock 418 is coupled to negatively-enabled clock input 437, 438 and 439 of data flip-flops 420, 422 and 424, respectively. Likewise, monitoring clock 418 is coupled to positively-enabled clock input 457, 458, and 459 of data flip-flops 440, 442, and 444 respectively. Finally, monitoring clock 418 is coupled to the positively-enabled clock input 405 of data flip-flop 404 and to negatively-enabled clock input 407 of data flip-flop 406. With this arrangement, the entire sensing and indexing operation is controlled by monitoring clock 418.

The normal outputs of all data flip-flops 420, 422 and 424 are coupled to the input side 472 of a first-type logic gate 470 and to an input side 462 of a second-type logic gate 460. Likewise, normal outputs of all data flip-flops 440, 442 and 444 are coupled to the input side 478 of a first-type logic gate 476 and to an input side 468 of a second-type logic gate 466. In the present embodiment, first-type logic gate is an "AND" gate and second-type logic gate is a "NOR" gate. However, the present invention is equally well-suited to alternative logic configurations.

Similarly, while the present embodiment has two logic gates for each 'type' of logic, e.g. first-type logic gate 408 and 410, the present invention is equally well suited for utilizing a single gate with a greater amount of input leads. Outputs 474 and 464 of first-type logic gate 470 of second-type logic gate 460 respectively, are coupled to the input of a logic gate 480. Likewise, outputs of first-type logic gate 476 and of second-type logic gate 466 are coupled to inputs 488a and 488b of logic gate 486. Logic gates 480 and 486 allow the clock-monitoring circuit to output an indicating signal for both a constant high-logic and a constant low-logic condition of clock source 403. Outputs 484 and 489 of logic gates 480 and 486, respectively, are coupled as inputs 492 of logic gate 490. Logic gate 490 is provided to tie together the two first-type logic gates 470 and 476 and the two second-type logic gates 460 and 466 in lieu of using a single first-type logic gate and a single second-type logic gate with a higher quantity of input leads. The output lead 494 from logic gate 490 provides the final output from the clock-monitoring circuit 400. Output lead 494 provides an asynchronous clearing signal into data flip-flops of the appropriate asynchronously-enabled clock circuit.

METHOD OF CIRCUIT OPERATION

Figure 5:
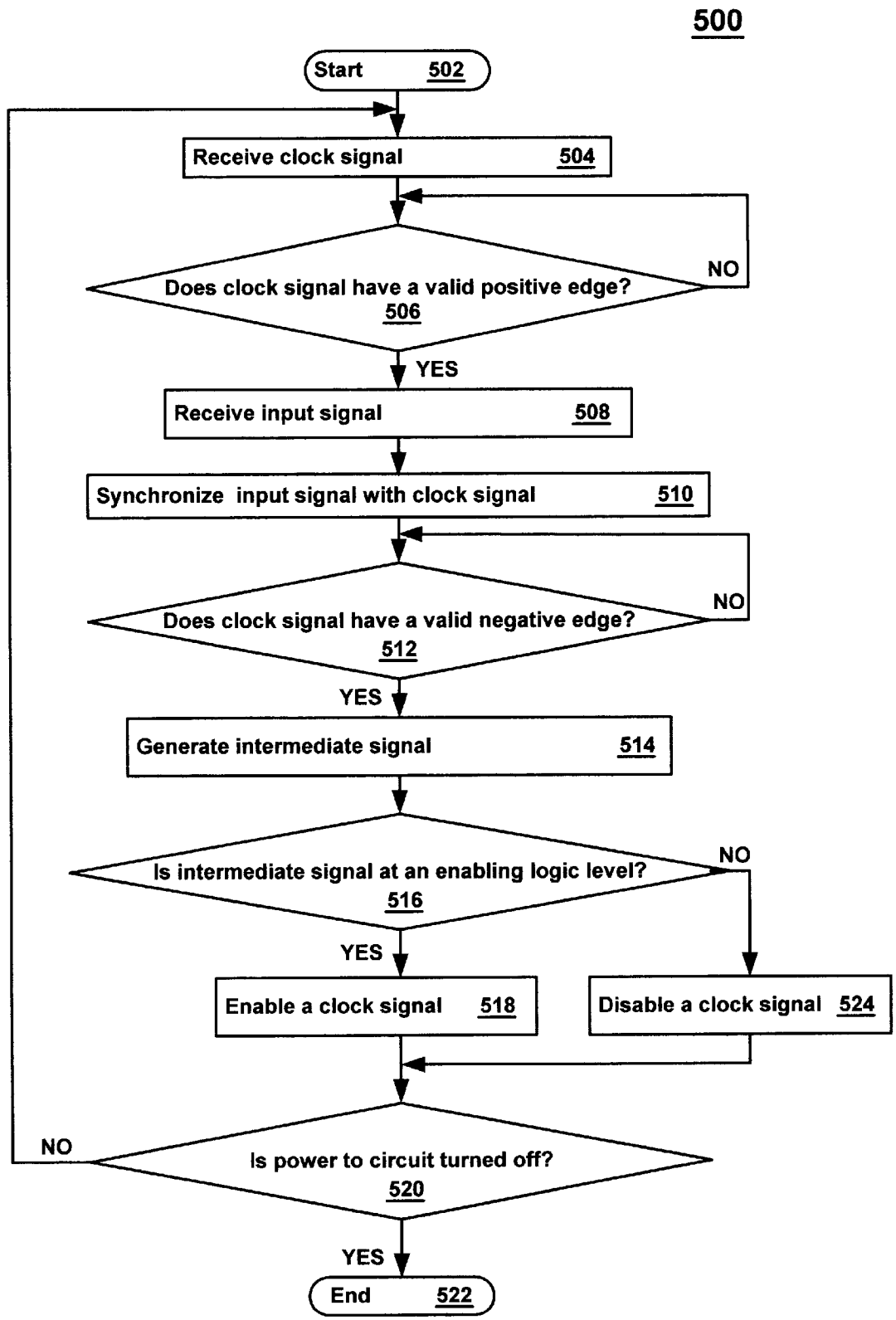
FIG. 5 is a flow chart of the steps performed to provide an unclipped clock signal output from an asynchronously-enabled circuit in accordance with one embodiment of the present invention.

Referring now to FIG. 5, a flowchart 500 of the steps performed for asynchronously enabling a clock signal is presented. The method is realized using an asynchronously-enabled clock circuit 200 as illustrated in FIG. 2A.

As shown in FIG. 5, at step 504 the present embodiment receives a clock signal. Using FIGS. 2A and 2B in conjunction with FIG. 5 to illustrate this step, clock signal 260 is communicated to asynchronously-enabled clock circuit 200 via clock input lead 202.

Next, at step 506, the present embodiment inquires whether the clock signal has a valid positive edge. If the clock signal does not have a valid positive edge, then the synchronizer is not enabled, and the flowchart cannot proceed. Hence, if the response to step 506 is 'no', then step 506 is repeated. An affirmative response to step 506 means that the proper positive edge has enabled the clock inputs 228 and 230 of the data flip-flops 212 and 214 respectively in the synchronizing portion 206 of the asynchronously-enabled clock circuit 200. While the present embodiment requires the clock signal to have a valid positive edge, the present invention is equally applicable to an appropriate enabling logic for an alternative synchronizer configuration.

Figure 2B:
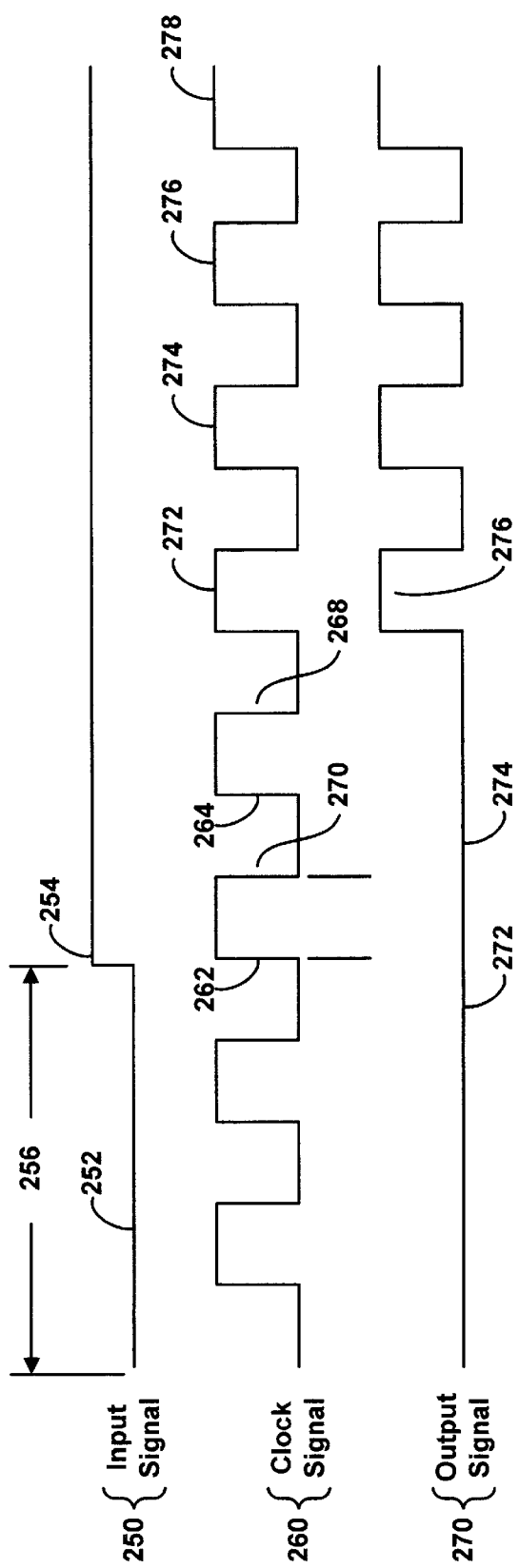
FIG. 2B is an illustration of wave forms arising from operation of the asynchronously-enabled clock circuit of FIG. 2A in accordance with one embodiment of the present invention.

In the present embodiment, step 508 arises if the response to step 506 was 'yes'. In step 508, the input signal is received. The following description superimposes the time-domain signals presented in FIG. 2B onto the appropriate portions of the spatial-domain circuit illustrated in FIG. 2A. As shown in FIG. 2A, input signal is received on enable lead 204. As shown in FIG. 2B, the input signal is exemplified as having a low logic level 252 for a duration 256 followed by a high logic signal 254. While a high logic signal enables the circuit in the present embodiment, the present invention is equally well suited to having a low logic enable for an appropriately configured circuit.

Figure 3B:
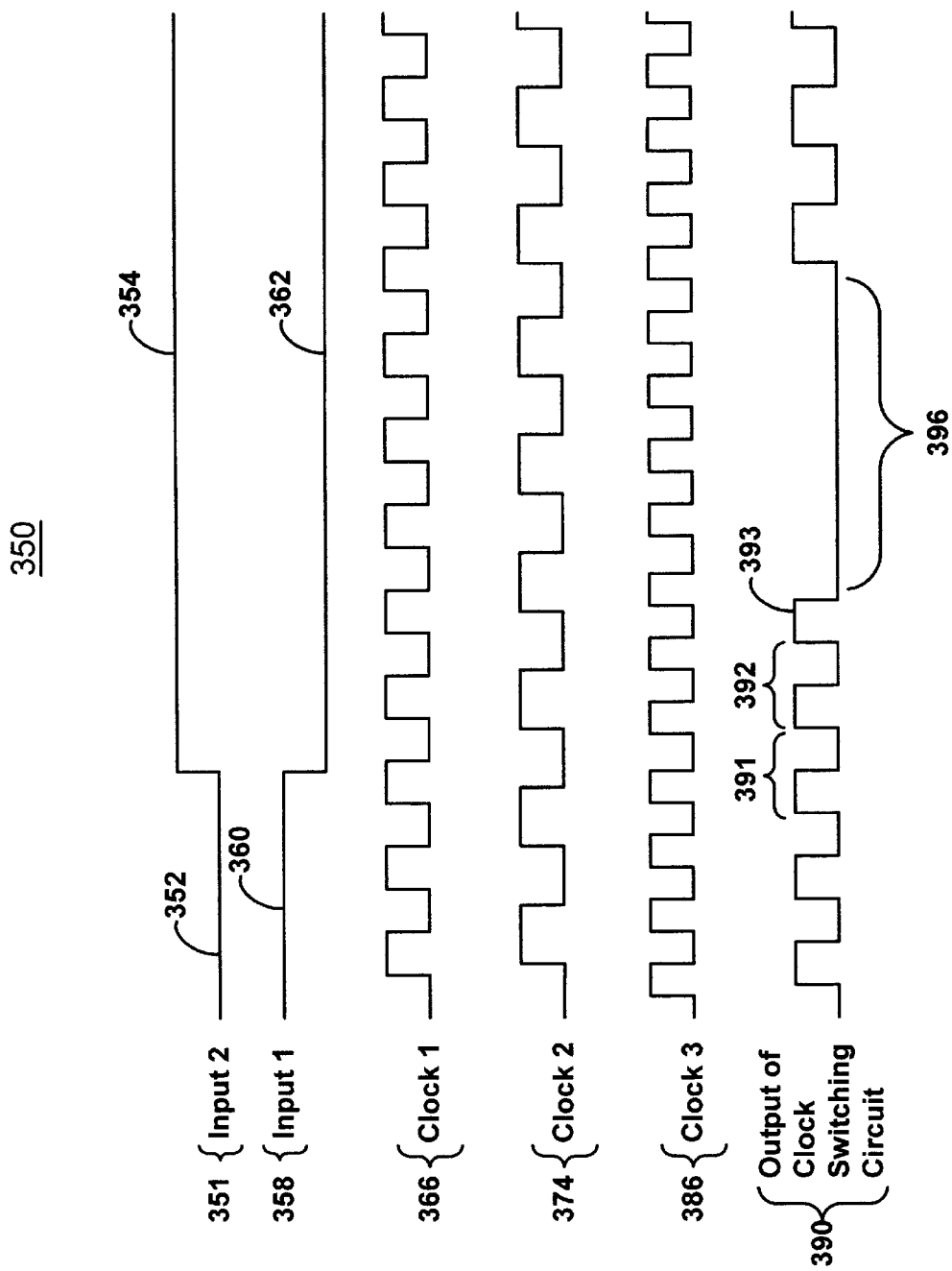
FIG. 3B is an illustration of wave forms arising from operation of the clock-switch circuit of FIG. 3A in accordance with one embodiment of the present invention.

At step 510, the present embodiment synchronizes the input signal the clock signal. This step can be accomplished by several methods that are known in the art. The synchronization prevents the clock signal from being clipped as shown in FIG. 3B. One embodiment of a synchronizer is presented in FIG. 2A as positive edge enabled data flip-flops 212 and 214. It should be noted that positively enabled is understood to be the same as positive edge enabled. The process of synchronization is illustrated by superimposing input signal 250 of FIGS. 2B onto input lead 204 of FIG. 2A, and by superimposing clock signal 260 of FIG. 2B onto input lead 202 of FIG. 2A. As data flip-flop 212 of FIG. 2A receives a positive edge 262 from clock signal 260 of FIG. 2B, at clock input 228, the input signal 250 at data port 216 of flip-flop 212 is communicated to the normal output 218 of data flip-flop 212. When clock signal goes to does not produce a positive edge, such as positive edge 262, then data flip-flop 212 cannot change its state. Hence, in this case, the normal output 218 stays at high logic level. The same sequence arises for data flip-flop 214. If the input signal stays at high logic level 254 for a sufficient period of time, then the normal output 222 from data flip-flop 214 will go to high logic level at a positive edge 264 one cycle after the positive edge 262 received at first data flip-flop 212.

At step 512, the present embodiment inquires whether the clock signal has a valid negative edge. If the response is 'no' then the inquiry is repeated. If the response to step 512 is 'yes' then the flowchart proceeds to step 516. The negative edge on the clock signal is required to enable the negatively-enabled clock input 232 for data flip-flop 208 as illustrated in FIG. 2A.

In step 514, the present embodiment generates an intermediate signal. The intermediate signal refers to the output from negatively-enabled data flip-flop 208 as shown in FIG. 2A. When a valid negative edge of the clock signal occurs, the value at data input 224 of data flip-flop 208 will also be the value of the normal output 226. Looking to FIG. 2B, if negative edge 268 enabled data flip-flop 208, then the normal output 222 from the synchronizer 206 will be relayed through data flip flop 208 to its normal output 226. The intermediate signal is communicated to input 236 of logic gate 210.

At step 516, the present embodiment inquires whether intermediate signal is at an enabling logic level. As shown in FIG. 2A, an enabling logic level for the present embodiment, an "AND" gate 210, would be a high logic level. Hence, a "yes" response to the inquiry of step 516 means that a high logic level output from synchronization step 510 of a high logic input signal 254 was communicated through data flip-flop 208 and into input 236 of logic gate 210. If the response to the inquiry of step 516 is "no" then the flowchart proceeds to step 524.

In the present embodiment, step 524 disables the clock signal. As mentioned, step 524 arises if an enabling logic level is not produced in step 516. If an enabling logic level is not produced, then in a binary system, a disabling logic exists. As shown in FIG. 2A, the disabling logic from data flip-flop 208 is a low logic level. When this low logic level is communicated to AND gate 210, the AND gate can never generate a high logic level, and hence is disabled. After the completion of step 524, the flowchart continues to step 520.

In the present embodiment at step 518, the clock signal is enabled and clock signal 260 is free to pass the output of AND gate 210. Additionally, if no enabling intermediate signal is generated, clock signal 260 would be blocked from being transmitted through AND gate 210. The high logic level of the signal at input 236 enables AND gate 210 to output the high logic of the clock signal 260 at output 234 when clock signal 260 at input 238 of AND gate 210 is at high logic level. As shown in FIG. 2B, negative edge 268 of clock signal 260, following the synchronization step 510, allows the high logic level 254 of input signal 250 to enable the AND gate 210 to output the high logic levels 272, 274, 276 and 278 of clock signal 260.

At step 520, the present embodiment inquires whether clock-enable circuit is powered off. If the response is "yes" then the flowchart terminates at step 522. If the response is "no" then the flowchart essentially repeats itself by returning to step 504. In the present embodiment, the steps are limited by the frequency of the clock signal 260. The data flip-flops are only activated by the positive and negative edges of the clock, whose timing is dictated by the frequency of the clock source 260. By utilizing the steps presented in flowchart 500, the benefit of enabling the clock signal at a negative edge 268 is realized. This benefit will have further advantages, such as a glitch-free clock output, when it is applied to the clock-switching steps presented hereinafter. It is understood that serial steps were used in flowchart 500 to clarify the present embodiment, the true nature of digital designs, such as the present invention, is to evaluate the decision blocks in a continuous and parallel fashion. In other words, decision blocks 506, 512, 516, 520 of FIG. 5 are constantly being evaluated.

Figure 6:
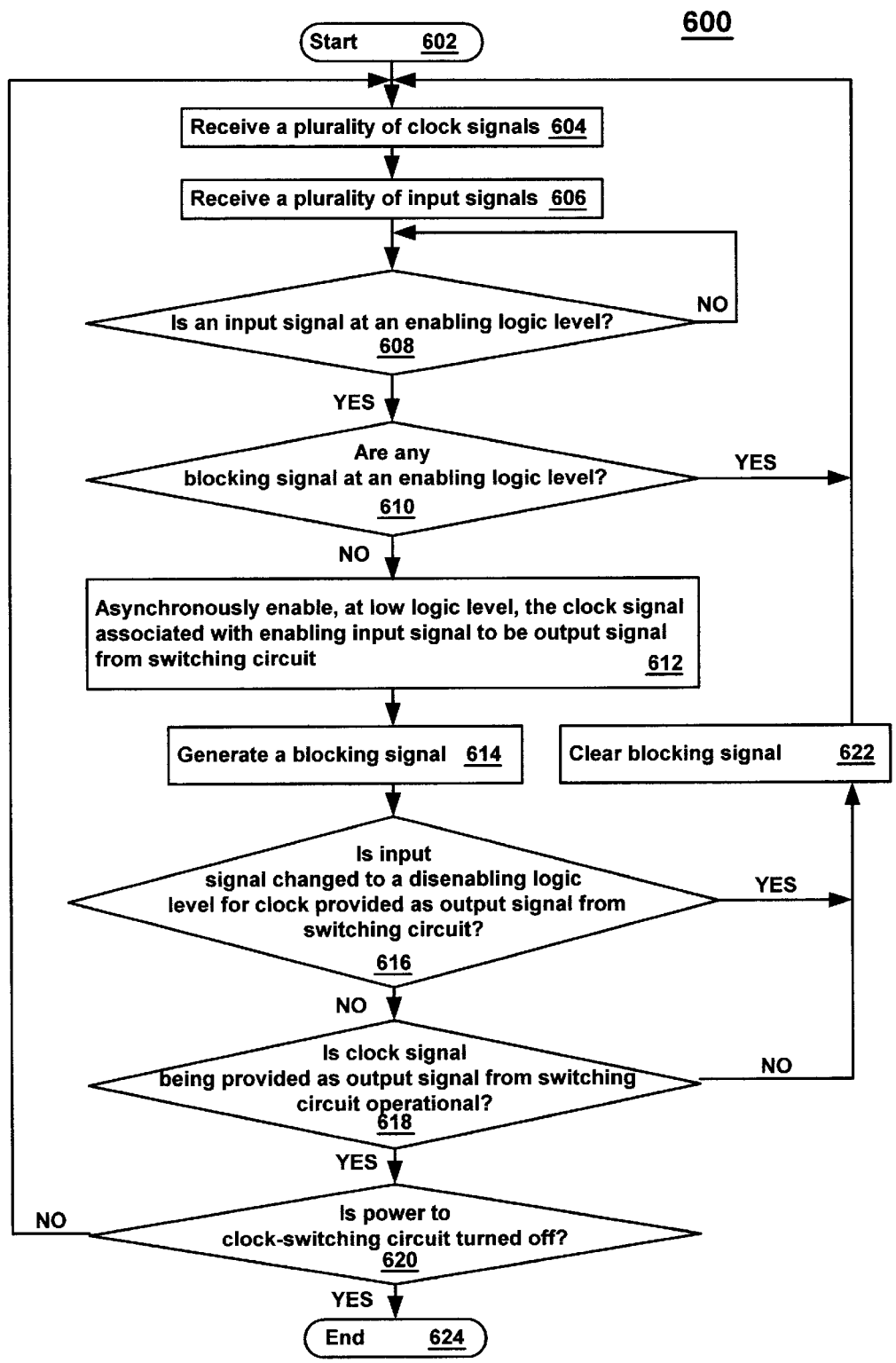
FIG. 6 is flow chart of the steps performed to provide a glitch-free and unclipped and(itch-free clock signal output for a clock-switching circuit from among multiple clock inputs in accordance with one embodiment of the present invention.

Referring now to FIG. 6, a flowchart 600 of the steps performed for providing a glitch-free clock output signal from among multiple asynchronously enabled clock input signals is presented. The steps provided in flowchart 600 will be described by superimposing the time-domain traces 350 presented in FIG. 3B onto the appropriate portions of the spatial-domain circuit illustrated in FIG. 3A.

As shown in step 604, in this embodiment, a plurality of clock signals are received at the clock-switching circuit 300. Step 604 is illustrated in FIG. 3B where a first clock 240 and a second clock signal 345 are shown coupled to the clock-switching circuit 300.

In the present embodiment, at step 606, a plurality of input signals are received at the clock-switching circuit 300. The input signals can have either a high logic or a low logic level. In the present embodiment, a high logic level is enabling while a low logic level is disabling. However, the present invention is equally well-suited to using reversed logic.

At step 608, the present embodiment inquires whether an input signal is at an enabling logic level. More than one input signal can have an enabling logic level. However, no conflict will occur in the output of the clock-switching circuit thanks to a blocking signal logic described hereinafter. If the response to step 608 is "no" then the step is repeated. However, if the response to step 608 is "yes" then the flowchart 600 proceeds to step 610. As exemplified in FIG. 3B, first input signal 358 is initially at a high logic level 360 while second input signal 351 is initially at a low logic level 352. Hence, the response to step 608 for the example in FIG. 3B is "yes".

At step 610, the present embodiment inquires whether any blocking signals exist at an enabling logic level (i.e. enabling the blocking to occur). In the present embodiment, a low logic level is used to enable a blocking signal.

However, the present invention is well suited to an opposite logic scheme.

Additionally, although the present embodiment refers to a "blocking signal" the present invention is equally well suited to any kind of signal that will disable an enabling input signal for a clock other than a different clock that is currently enabled and providing the output clock signal for the clock-switching circuit 300.

As exemplified in FIG. 3A, a blocking circuit 306 is mated to one asynchronously-enabled clock circuit 200 and will communicate a blocking signal via blocking lead 336 to the balance of the blocking circuits, e.g. blocking circuit 308, in clock-switching circuit 300. In this manner, if a blocking signal exists, at its enabling low logic level, it will disable logic gate 348, and thus prevent a potentially high logic input signal from being communicated from input 349 to data flip-flop 343. Although FIG. 3B illustrates input signal 1 at a high logic level 360 initially, all input signals are presumed at a low logic level for purposes of clarity in the flowchart. However, the present invention is well suited to having multiple high logic input signals as will be illustrated below. If the response to step 610 is "yes" then step 604 will be performed. This means that the flowchart will repeatedly check for both conditions of a high enable logic and no blocking signal prior to advancing to the next step, step 612. If the response to step 610 is "no" then step 612 will occur.

In the present embodiment, at step 612, the clock signal is asynchronously enabled at a negative edge of the clock signal, and thereby provided as the output from the clock-switching circuit 300. As illustrated in FIGS. 3A and 3B, if a first input signal 358 at a high logic level 360 is received at input lead 316 of blocking logic gate 312 and no blocking signal is received from all other blocking circuits, e.g. on lead 347 from blocking circuit 308 at input lead 320 of blocking logic gate 312, then the blocking logic gate 312 is enabled and subsequently outputs a high logic level signal to asynchronously-enabled clock circuit 200 via data flip-flop 322. Subsequently, the high logic level is communicated through data flip-flops 212, 214, and 208. The time delay in the flip-flops is illustrated as the low-logic level delay 396 in output of clock-switching circuit. The specific operation of asynchronously-enabled clock circuit is described herein in detail, supra. The point here is that the asynchronously enabled clock circuit and the clock switching circuit ensure that the output of clock-switching circuit is free of glitches.

In the present embodiment, at step 614, a blocking signal is generated because one of the clocks has been enabled as the output clock signal of the switching circuit 300. As mentioned, the blocking signal will effectively prevent other clocks from providing their signals as an output from the clock-switching circuit. In this manner, potential conflicts of multiple signals at the output of clock-switching circuit is avoided. The present embodiment is illustrated in FIGS. 3A and 3B where a high logic signal from normal output 226 of data flip-flop 208 is communicated to its blocking circuit 306. Subsequently, when data flip-flop 328 is enabled by synchronizing clock 310, it will output the high logic signal from its normal output 332. After inverting the high logic signal with an inverter 334 to a low logic level, the signal will be communicated to the balance of the blocking circuits, e.g. blocking circuit 308 at input lead 346, so as to disable their input signals and thereby avoid conflict at the output of clock-switching circuit 300. Although the present embodiment provides a very specific implementation of this step, the present invention is well-suited to a wide-variety of circuits and components that can accomplish this step.

At step 616 the present embodiment inquires whether the input signal has changed to a disabling logic level for the clock that is currently provide as the output clock signal for clock-switching circuit 300. If the response is "yes" then step 622, described hereinafter, occurs. If the response is "no" then step 618 occurs. Note that for all the steps in the blocking circuit, e.g. the first data flip-flop 322 and the second data flip-flop 328, are only enabled by the pulses of the synchronizing clock 310. Hence, a change in state can only occur as the synchronizing clock and data flip-flops permit.

The present embodiment, at step 622, clears the blocking signal. Similar to the step that generated the blocking signal, this step follows the same basic sequence and same basic use of circuitry, albeit in an opposite logic, and hence the clearing. More specifically, if the first input signal 358 illustrated in FIG. 3B changes from a high logic level 360 to a low logic level 362, and is communicated to input lead 316 of blocking circuit 306 as illustrated in FIG. 3A, then the process of clearing the blocking signal will ensue. Because input lead 316 will be at a low logic level, logic gate 312 will now provide a low logic signal on its output lead 313. This low logic signal will subsequently propagate through data flip-flops 322,212, 214, and 208 as enabled by clock signal 260. Finally, the last data flip-flop 208 will communicate the low logic signal from its normal output 226 to the second data flip-flop 328 in blocking circuit 306. The low logic signal will be output from second data flip-flop 328 at its normal output 332 and inverted by inverter 334. Lead 336 will communicate this signal to the balance of the blocking circuits, e.g. blocking circuit 308. In this fashion, all other blocking circuits will now have their blocking logic gate, e.g. 348, enabled to pass a high input 349 downstream.

The present embodiment of step 622 of is further illustrated in FIG. 3B. When first input signal 358 changes from a high logic level 360 to a low logic level 362, the output of clock-switching circuit 390 will cease outputting first clock signal 366. However, as shown on the output of clock-switching circuit 390, there is a time-lag associated with the circuitry. Hence, two and a half cycles 391, 392, and 393 will pass before first clock signal 366 ceases to be provided as the output for clock-switching circuit 300. Specifically, this lag is directly correlated to the indexing property associated with the coupled data flip-flops 322, 212, 214 and 208. Likewise, one synchronizing clock cycle after first clock signal 366 stops as output from clock-switching circuit 300, blocking data flip-flop 328 will clear the blocking signal and allow any other input signal to be enabled, e.g. second input 351.

The present embodiment, at step 618, inquires whether the clock signal is being provided as the output clock signal from clock-switching circuit 300 is operational. In other words, a single clock might be designated as the actual output signal for the clock-switching circuit. However, if the clock has failed, then the clock-switching circuit may be providing a constant flat signal, at low logic or high logic level. With a signal such as this, downstream communication circuitry would subsequently fail. This is extremely undesirable, and thus, this condition is monitored constantly. Typically, this is a problem only when the clock is a recovered clock signal, and hence obtained from the input data via a phase lock loop (PLL) circuit. When no input data exists, then the recovered clock cannot be generated. This is precisely the condition that step 618 checks, although step 618 can be used to monitor any type of clock signal. The specific operation of step 618 is more fully described in flowchart 700 of FIG. 7, hereinafter. If the response to this inquiry is "no" then the flowchart proceeds to step 622, clearing the blocking signal. If the response to the inquiry of step 618 is "yes" then the flowchart proceeds to step 620. If clock 2 in FIG. 3A were such a bursting clock, clock-monitoring circuit 400 of FIG. 4 would communicate a logic level appropriate to reset the flip-flops in asynchronously-enabled clock circuit 304, thereby forcing its output 305a to a low logic level. This low logic level is then communicated to input 305b of blocking circuit 308, thereby resetting the blocking signal.

At step 620, the present embodiment inquires whether the switching circuit is powered off. If the response is "yes" then the flowchart terminates with step 624. If the response is "no" then the steps of the flowchart are repeated, starting at step 604. In this manner, the flowchart is repeated continuously until the clock-switching circuit itself is disabled.

Figure 7:
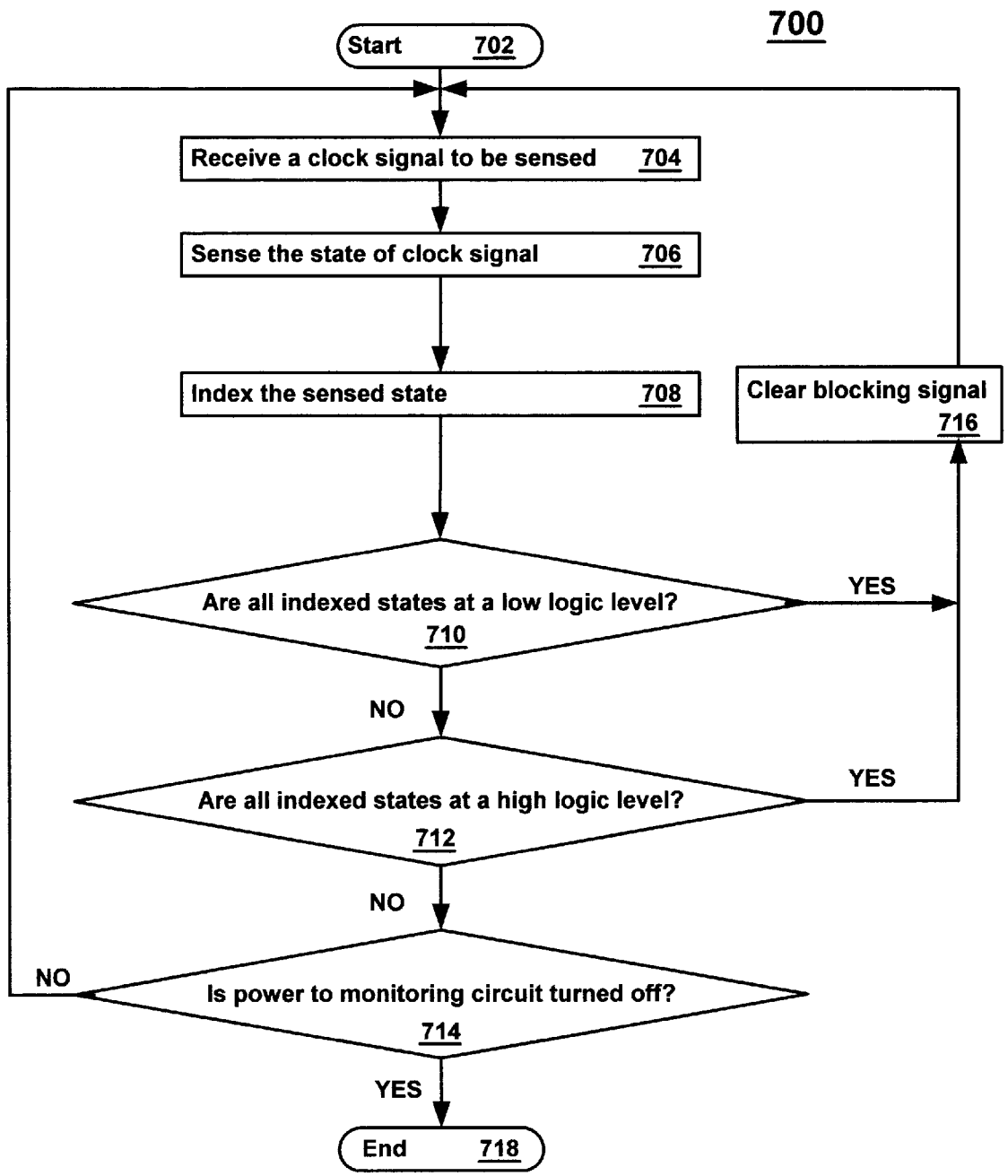
FIG. 7 is flow chart of the steps performed to indicate whether a valid clock signal exists by use of a cock monitoring circuit in accordance with one embodiment of the present invention.

Referring now to FIG. 7, a flowchart 700 of the steps performed to monitor a clock signal are presented. The steps provided in flowchart 700 are realized in the clock-monitoring circuit 400, illustrated in FIG. 4. As previously mentioned, the issue of monitoring a clock to ensure it is presenting an operational signal generally arises in a recovered clock, although any clock may be monitored with this flowchart. A recovered clock is typically generated from an input data stream via a phase lock loop (PLL) circuit, rather than using a traditional and independent crystal-based oscillator. With a recovered clock, when no input data exists, the recovered clock signal cannot be generated. Hence it needs to be constantly monitored and have its blocking signal cleared if it has been enabled at one time as the output of clock-switching circuit 300, but has subsequently failed to provide a clock signal before a disabling input signal propagated through asynchronously-enabled clock circuit to second data flip-flop in blocking circuit.

In the present embodiment, at step 704, the clock signal to be sensed is received. This step is realized in FIG. 4 where clock 403 is coupled to the balance of clock-monitoring circuit 400 via input lead 402.

As shown in step 706, the present embodiment senses the state of the clock signal to be monitored. The sense circuit receives the clock signal value at a specific period of time and for a specific duration as provided by the frequency of the monitoring clock 418. The sensing flip-flops 404 and 406 are enabled by a high logic and a low logic respectively of the monitoring clock signal. While they are enabled, the data flip-flops will provide the signal level from its data input 408 and 410 respectively, to its normal output 412 and 414 respectively. Hence, the sampling occurs at a frequency twice that of the frequency of the monitoring clock signal. However, the present invention is equally well suited to sampling only once during a cycle of a monitoring clock, with a corresponding adjustment in the frequency of the monitoring clock to satisfy the Nyquist rate requirement. In the present embodiment, the monitoring clock operates at 25 MHz while the clock to be monitored operates at only 10 MHz. Hence the monitored clock signal is sampled 5 times during one of its own cycle, a 5:1 ratio. While the Nyquist rate would only requires the sampling to be a 2:1 ratio, by using the 5:1 ratio of the present embodiment, the sensing is more accurate and the response time of the circuit is faster.

In the present embodiment, at step 708, the sensed state is indexed. The index circuit performs the indexing, thereby providing a running history of a previous quantity of sensed clock signal values. In the present embodiment, as shown in FIG. 4, a running history of six sensed clock signal values is maintained by six flip-flops 420, 422, 424, 440, 442 and 444. Because the sampling rate is 5:1, the six samples provided actually exceed, by one sample, a full cycle of the clock to be monitored. As mentioned above, because the present embodiment samples at the positive and negative edges of the monitoring clock frequency, half of the circuit is positively-enabled and the other half is negatively-enabled. Thus, indexing flip-flops 420, 422, and 424 are negatively-enabled, opposite that of its coupled sensing data flip-flop 404, while indexing flip-flops 440, 442 and 444 are positively-enabled, opposite that of its coupled sensing data flip-flop 406. By having opposite enabling levels, sensing and indexing occur at different times, and conflict is avoided between the two steps.

At step 710, the present embodiment inquires whether all indexed states of the clock to be monitored are at a low logic level. This step checks to see if the clock to be monitored is essentially "dead" and providing no signal level whatsoever for an unacceptable period of time. While an unacceptable period of time for the present embodiment is defined as a time period greater than one half of the clock period, alternative criteria could be used with the present invention. If the response to this step is "yes" then the blocking signal for the monitored clock is cleared in step 716. Without clearing the blocking signal, the output of the clock-switching circuit 300 cannot be switched. And if the output is dead, then downstream circuits will most likely fail as well. If the response to step 710 is "no" then the flowchart proceeds to step 712. Step 710 is realized by coupling the outputs from the indexing flip-flops 420, 422, 424, 440, 442, and 444 into a first-type logic gate. In the present embodiment, the first-type logic gate is a "NOR" gate 460 and 466, as illustrated in FIG. 4. The NOR gate only outputs a high logic level if all the inputs are at low logic level, e.g. the clock signal input is all low, and hence dead. This high logic level output from first-type logic gates 460 and 466 will be utilized in step 716 to clear the blocking signal.

At step 712, the present embodiment inquires whether all indexed states of the clock to be monitored are at a high logic level. This step checks to see if the clock to be monitored sustains a high logic level for an unacceptable period of time. If the response to this step is "yes" then the blocking signal for the monitored clock is cleared in step 716. If the response to step 712 is "no" then the flowchart proceeds to step 714. In the present embodiment, the second-type logic gate is an "and" gate 470 and 476 as illustrated in FIG. 4. The AND gate only outputs a high logic level if all the inputs are at a high logic level, e.g. the clock signal input sustains a high logic level for an unacceptable period of time. The high logic level output from gates 470 and 476 will be utilized in step 716 to clear the blocking signal. In the present embodiment, an unacceptable period of time is a time greater than half of input clock period.

While the present embodiment utilizes two gates with three inputs for each logic-type, the present invention is equally well suited to using a single gate with six inputs for each logic type. Likewise, the present invention is well suited to using any quantity of inputs as required by the Nyquist rate, considering the frequencies of the clock to be monitored and the monitoring clock. Because the present embodiment utilizes two gates for each logic type and because they both need to be satisfied, as mentioned previously, the clockmonitoring circuit 400 must tie the gates together. It does so by an output "and" gate 490. Likewise, the present invention is equally well suited to only checking one logic level rather than both.

In the present embodiment, at step 716, the blocking signal for the clock being monitored is cleared. In this manner, the clock-switching circuit has the capability of switching to another clock and providing a better clock signal as the output signal from clock-switching circuit 300. Without this step, clock-switching circuit 300 is essentially locked up by the failed clock signal. The lock-up occurs because data flip-flops, e.g. 212, 214, and 208 of FIG. 3A, in an asynchronously-enabled clock circuit, e.g. circuit 200, are only enabled if its clock, e.g. clock 240, is operating properly. To overcome this, the blocking signal must be cleared by coupling the high output logic signal from clock-monitoring circuit 400 to a reset input to each of data flip-flops, e.g. 212, 214, and 208, for the asynchronously-enabled clock circuit that has a malfunctioning clock input signal that is currently being provided as the output from a clock-switching circuit. The high logic subsequently enables all the blocking logic gates, e.g. 348, in the balance of the blocking circuits, e.g. 308, thus enabling them to provide their clock signal as the output clock signal for clock-switching circuit 300 if they receive an enable signal, e.g. on enable input 349.

At step 714, the present embodiment inquires whether the monitoring-circuit has been powered off. If the response to step 714 is "yes" then the flowchart terminates at step 718. If the response to step 714 is "no" then the flowchart is repeated, starting at step 704. Hence, the monitoring process is a continual one.

Figure 8:
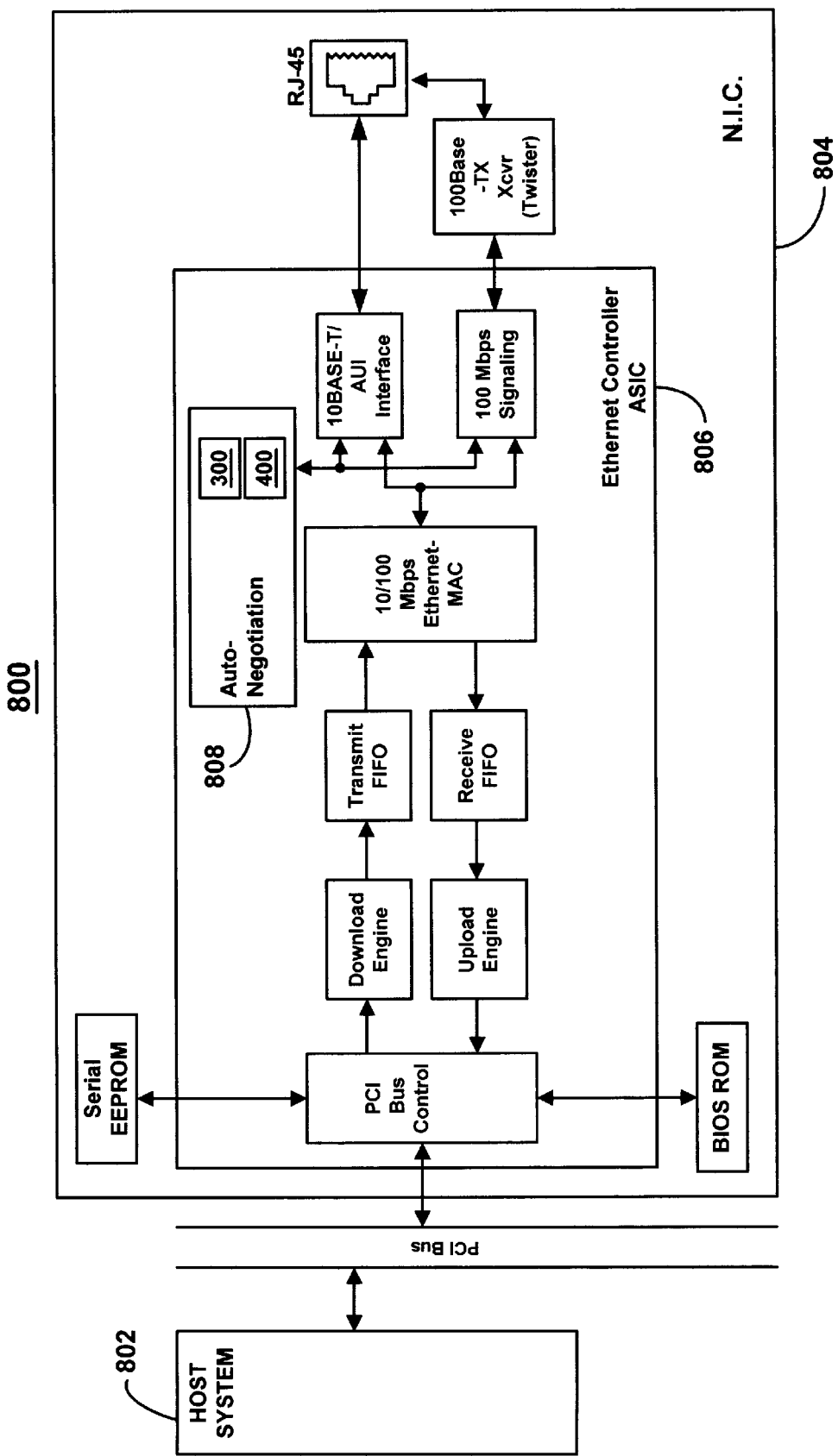
FIG. 8 is a block diagram illustrating the components of a network interface card and their coupling in accordance with one embodiment of the present invention.

Referring now to FIG. 8, a block diagram 800 illustrating the interconnection of a host computer system 802 having a network interface card 804 coupled thereto is shown. In the embodiment of FIG. 8, network interface card 804 includes an ASIC (application specific integrated circuit) 806, which contains various components and features. Within ASIC is an auto-negotiation block 808 that houses the clock-switching circuit 300 and the clock-monitoring circuit 400. Although such a specific implementation is shown in the embodiment of FIG. 8, the present invention is also well suited to an embodiment having various other components and features.

Thus, the present invention provides an asynchronously enabled clock circuit that provides an output clock signal with unclipped pulse widths approximately identical to the input clock signal. Furthermore, the present invention provides a clock-switching circuit with reduced size, reduced external components, and reduced software delays. At the same time, the present invention provides a clock-switching circuit with glitch-free output clock signals for start-up and for switching. Additionally, the present invention provides a clock-switching circuit that guarantees asynchronous switching between unclipped clock signals without creating a glitch in the output from the switching process. Finally, the present invention provides a clock-switching circuit that can exist with or without a recovered clock signal.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. An asynchronously-enabled clock circuit providing an unclipped clock signal at its output, said asynchronously-enabled circuit comprising:

a clock input lead, said clock input lead providing a clock signal to an asynchronously-enabled clock circuit;

an enable lead, said enable lead providing logic levels that enable and disable said clock signal as output from said asynchronously-enabled clock circuit;

a negatively-enabled logic block, said negatively-enabled logic block coupled to said clock input lead and to said enable lead; and a logic gate, said logic gate coupled to said negatively-enabled logic block and to said clock input lead.

2. The asynchronously-enabled clock circuit as recited in claim 1 further comprising:

a synchronizer, said synchronizer coupled to said negatively-enabled logic block, to said clock input lead, and to said enable lead.

3. The asynchronously-enabled clock circuit as recited in claim 2 wherein said synchronizer comprises:

a plurality of positively-enabled data flip-flops, said plurality of positively-enabled data flip-flops coupled to each other, coupled to said clock enable lead, coupled to said clock input lead, a first of said plurality of positively-enabled data flip-flops coupled to said negatively-enabled logic block, and a last of said plurality of positively-enabled data flip-flops coupled to said logic gate.

4. The asynchronously-enabled clock circuit as recited in claim 1 further comprising:

a first and a second positively-enabled data flip-flop, said first positively-enabled data flip-flop having a data input coupled to said clock enable lead and having a clock enable input coupled to said clock input lead, said second positively-enabled data flip-flop having a data input coupled to a normal output of said first positively-enabled flip-flop and having a clock enable input coupled to said clock input lead, said negatively enabled logic block having a data input coupled to a normal output of said second positively-enabled data flip-flop, having a clock input coupled to said clock input lead, and having a normal output coupled to said logic gate.

5. A clock-switching circuit that provides a single unclipped and glitch-free clock signal at its output from among multiple asynchronously-enabled clock input signals, said clock-switching circuit comprising:

a plurality of asynchronously-enabled clock circuits;

a plurality of blocking circuits, each of said plurality of blocking circuits having a disable lead, an enable lead, and an output lead, said enable lead providing an asynchronous signal to enable one of said plurality of asynchronously-enabled clock circuits respectively coupled to one of said plurality of blocking circuits, said output lead coupled to said disable lead of balance of said plurality of blocking circuits, said disable lead coupled to said output lead of balance of said plurality of blocking circuits, said disable lead disabling all of said plurality of asynchronously-enabled clock circuits except the one to which its input is coupled;

a synchronizing clock, said synchronizing clock coupled to each of said plurality of blocking circuits; and a output logic gate, said output logic gate coupled to each of said plurality of asynchronously-enabled clock circuits, said output logic gate providing said unclipped and glitch-free output signal from a clock-switching circuit.

6. The clock-switching circuit as recited in claim 5 wherein each one of said plurality of blocking circuits is comprised of:

a first data flip-flop, said first data flip-flop coupled to an enable lead of one of said plurality of asynchronously-enabled clock circuit, said first data flip-flop coupled to said synchronizing clock;

a logic gate, said logic gate coupled to said first data flip-flop;

a clock enable lead, said clock enable lead coupled to said logic gate, said clock enable lead receiving a signal indicating which clock of said plurality of asynchronously-enabled clock circuits is desired as the output of said clock-switching circuit; and a second data flip-flop, said second data flip-flop having a data input, an enabling input, and a normal output, said data input respectively coupled to one of said plurality of asynchronously-enabled clock circuits, said enable input coupled to said synchronizing clock, and said normal output coupled to said disable lead of the balance of blocking circuits, said output of said second data flip-flop provided to disable all of said plurality of asynchronously-enabled clock circuits except the one to which said input of said second data flip-flop is coupled.

7. The clock-switching circuit of claim 5 wherein one of said plurality of clock asynchronously-enabled clock circuits is coupled to a recovered clock.

8. The clock-switching circuit as recited in claim 5 further comprising:

at least one clock monitoring circuit.

9. A method of switching between multiple clock input signals to provide a single unclipped and glitch-free output clock signal, said method comprising the steps of:

a) receiving a plurality of clock signals at a clock-switching circuit;

b) receiving a plurality of input signals, each of said plurality of input signals provided to enable and disable its respective one of said plurality of clock signals, each of said plurality of input signals having an enabling and a disabling logic level;

c) switching an output signal of said clock-switching circuit from a first of said plurality of clock signals to a second of said plurality of clock signals only at time periods when said first and said second of said plurality of clock signals have a low-logic level;

d) enabling one of said plurality of clock signals to be said output signal of said clock-switching circuit without clipping when its respective one of said plurality of input signals receives an enabling logic level and when a blocking signal has not been generated by any of said plurality of clock signals other than said enabled one of said plurality of clock signals; and e) generating a blocking signal to protect from potential conflict said one of said plurality of clock signals that is enabled as said output signal of said clock-switching circuit.

10. The method of switching between multiple clock input signals as recited in claim 9 further comprising the step:

f) clearing said blocking signal when said one of said plurality of input signals for said one of said plurality of clock signals that is currently provided as said output of said clock-switching circuit receives said disabling logic level.

11. The method of switching between multiple clock input signals as recited in claim 10 further comprising the step:

g) enabling a change in the state of said blocking signal and a change in the state of said input signal at a time duration and frequency based on a synchronizing frequency.

12. The method of switching between multiple clock input signals as recited in claim 10 further comprising the step:

f) clearing said blocking signal when said one of said plurality of clock signals enabled as said output signal of said clock-switching circuit subsequently fails to provide an operating clock signal.

* * * * *